Inventor
Sam H. Kaplan
By John J. Pederson
Attorney

Inventor
Sam H. Kaplan
By John J. Pederson
Attorney

Inventor
Sam H. Kaplan
By John J. Pederson
Attorney

COLOR IMAGE REPRODUCERS

Filed Jan. 23, 1958 4 Sheets-Sheet 4

Inventor
Sam H. Kaplan
By John J. Pederson
Attorney 2,947,899

COLOR IMAGE REPRODUCERS

Sam H. Kaplan, Chicago, Ill., assignor to Zenith Radio Corporation, a corporation of Delaware Filed Jan. 23, 1958, Ser. No. 710,639

6 Claims. (Cl. 313—92)

This invention relates generally to image reproducers of the type suitable for use in color television reproduction and more particularly to such reproducers which utilize an aperture mask structure for selectively directing an electron beam onto a fluorescent screen.

Various types of color tubes for television receivers have been suggested and fabricated. One of the more frequently used types includes means for selectively directing an electron beam or beams through the apertures in a mask structure to impinge upon selected areas of a luminescent screen, which screen may comprise discrete phosphor dots disposed in a mosaic layer on the face-plate of a cathode-ray tube. Three such dots normally constitute an elementary phosphor triad, comprising a red, a green, and a blue phosphor dot, the dots being tangent to each other and ideally disposed so that the phosphor dot centers are coincident with the apices of an equilateral triangle. By directing an electron beam through a given mask aperture at a predetermined angle, a particular one of the sub-elemental phosphor dots in an elementary triad can be excited to give off energy at a particular wavelength, i.e., indicate a particular color. In this manner the three primary colors are reproduced, and simultaneous excitation of two or three dots in the same triad is effective to produce other hues.

A color television reproducing tube may utilize three separate electron guns, or by switching the beam from a single gun may, in effect, provide three separate electron beams; these beams are deflected in a well known manner to pass through the mask apertures and impinge on and excite certain of the phosphor dots. The three beams are considered as originating in a common plane, perpendicular to the axis of the tube, which plane is denominated the plane-of-color-centers. When one of the three electron beams is directed through a certain mask aperture to excite a particular phosphor dot, it is desirable that the circular beam landing area be centered on the particular phosphor dot. Such centering poses relatively few problems in a tube having a planar screen and a planar mask; however, the use of a curved screen and/or a curved mask presents certain problems.

Deflection fields are applied to the electron beams in a well known manner; such deflection may be said to commence in a plane perpendicular to the tube axis, the plane-of-deflection. As the deflection angle of the electron beam with respect to the tube axis is increased, the plane-of-deflection appears to move toward the fluorescent screen; such movement is well known and understood in the art. If the screen is constructed without regard to this apparent shifting of the plane-of-deflection with varying deflection angles, the triads offset from the tube axis are not correctly located on the screen as far as impingement of the beam is concerned; this error is hereinafter denominated the triad location error.

Another error encountered in the image reproducers under consideration results from the application of the dynamic convergence fields to the magnet windings external of the color tube. The convergence correction which these fields effect is required to establish coincidence of the three electron beams at the mask apertures as the deflection angle increases. However, the application of these corrective fields also has the undesirable effect of causing the beam landing areas to be displaced toward the outer edges of the phosphor dots in a triad as the distance of a triad center from the tube axis increases. Such displacement may reduce the useful illumination obtained by the beam landings and/or cause objectionable color dilution. The "spreading" error occasioned by the dynamic convergence correction is hereinafter designated the triad size error.

A more detailed description of the triad location and size errors is set forth in applicant's copending application entitled "Optical Correction in Manufacture of Color Image Reproducers," filed October 26, 1956, Serial No. 618,590, which is assigned to the assignee of this invention.

Still a third error, designated the triad shape error, affects spherical color tubes. The effect of the triad shape error is to produce on the screen a radial ("radial," as used herein, refers to the direction of a vector which points toward the tube axis) foreshortening of the triangle formed by connecting points coincident with the phosphor dot centers in a single triad as the distance from the axial beam landing area increases. The axial beam landing area on the screen is that area where the three electron beams are incident when no lateral deflection fields are applied to the beams, and they pass through the axial mask aperture to impinge on the axial beam landing area. This shape error is readily appreciated if the color centers are considered as points on a circle in the plane-of-deflection, the center of such circle being coincident with the tube axis. Viewing the circle in the plane-of-deflection from the screen along the tube axis, a perfect circle is observed; however, if the point of observation is displaced toward the edge of the screen, the true circle at the plane-of-deflection appears to be foreshortened or compressed into an ovate shape. This apparent compression causes the triad shape error, which is somewhat opposite in effect to the distortion produced by the triad size error. A coarse correction to minimize the effect of both the size and shape errors by off-setting one against the other has been attempted, but this compromise has not proven satisfactory.

Accordingly, it is an object of this invention to provide means for eliminating the undesirable effects of the triad shape error in the manufacture and use of color reproducing cathode-ray tubes.

It is a further object of this invention to provide such means suitable for utilization with the teaching of applicant's above-identified copending application, so that the effects of not only the shape error, but also of the triad location and size errors, are eliminated in a color cathode-ray tube.

In accordance with the invention, a compensated aperture mask structure is provided for a color-reproducing cathode-ray tube. The structure comprises a plurality of apertures which have a predetermined shape at the axial aperture but which are distorted into elliptical configurations by radial foreshortening as a function of their distance from the axial aperture.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
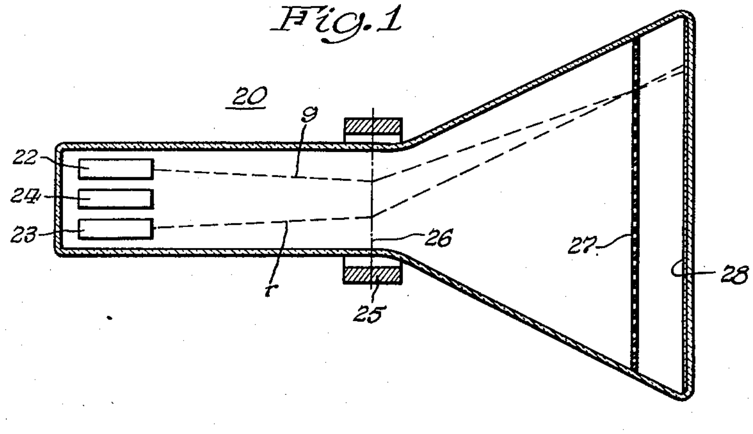
Figure 1 is a top view, partly in section, illustrating generally certain of the basic components of a color-reproducing cathode-ray tube having a flat mask and a flat screen.

Figure 1 shows a color-reproducing cathode-ray tube 20 having an envelope 21 which may be of glass. Those skilled in the art will recognize that many physical details unrelated to the invention (e.g., the pin connectors external to envelope 21 which are connected to various elements within the tube) are not shown in the drawings; the showing of such details would only obscure the invention. Three electron gun assemblies illustrated generally as rectangles 22–24 are disposed and arranged to emit electron beams; only the beams from guns 22 and 23 are illustrated, being designated *g* and *r*, respectively. The electron gun assemblies 22–24 can be disposed collinearly, or in a triangular form, depending upon other aspects of the tube construction. Alternatively, a single electon gun assembly can be utilized and the electron beam can be switched and deflected to simulate three separate electron beams.

The electron beams *g* and *r* are accelerated in a well known manner to pass through a deflection field created by signals applied to the yoke member 25. The deflection field alters the courses of the electron beams passing therethrough in accordance with the instantaneous signal applied to yoke 25. Such course alteration is gradual within the deflection field; for purposes of illustration and explanation, however, the course change is shown as occurring at a plane 26, hereinafter designated the plane-of-deflection. After deflection, the electron beams *g* and *r* pass through one of the apertures in the aperture mask 27 and impinge on the scanning side (the side on which the electron beams are incident) of screen 28.

Aperture mask 27 may include a plurality of circular apertures, in which case the screen 28 is covered with a plurality of circular phosphor dots. Three such phosphor dots constitute a triad, disposed in relation to a particular aperture of mask 27 so that the different electron beams passing through the same aperture impinge upon corresponding ones of the phosphor dots. In another type of construction, the apertures in mask 27 are shaped as slits, that is, as long, thin rectangular openings. In the latter construction, the phosphor material is deposited upon screen 28 in a linear pattern which is related to the disposition of the slits in mask 27. No matter the particular construction of mask and screen, the phosphor material is deposited on the scanning side of screen 28 so that a particular deflection of the electron beams through a certain aperture in mask 27 causes such electron beams to impinge upon certain preselected phosphor areas of the screen and thereby simulate a predetermined color.

The different phosphor areas, whether circular, linear, or of another configuration, disposed on screen 28 possess different color-response characteristics and are capable of emitting light of a different one of the component image colors when excited by the incidence of an electron beam. Such phosphor material may comprise for example, silver-activated zinc sulfide to produce a blue color, silver-activated zinc orthosilicate or willemite to produce green, and manganese-activated zinc phosphate to simulate a red color. The exposure techniques and the photo-resist materials utilized in screen fabrication are well known and understood in the art.

Figure 2:
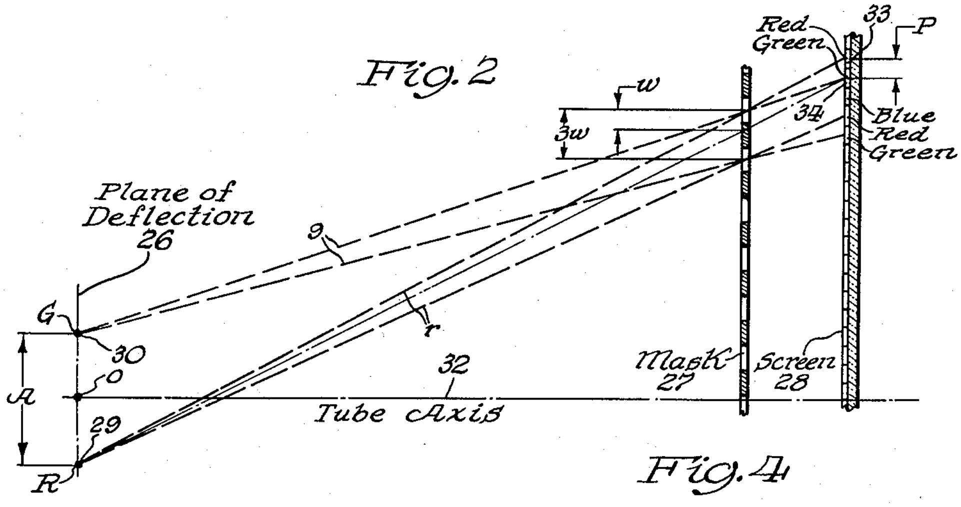
Figure 2 is a top illustrative showing of a portion of the structure depicted in Figure 1.
Figure 3:
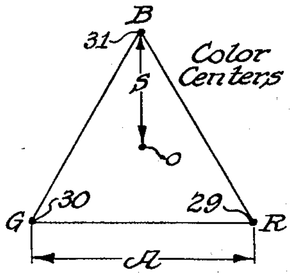

In Figure 2, looking downwardly at a portion of the interior of tube 20, the color centers 29 and 30 for the electron beams utilized to produce the red and green colors are also designated R and G, respectively. Color centers 29 and 30 are spaced apart by length A, and their relationship to the blue color center 31 (as viewed along the tube axis 32) is shown in Figure 3. In Figure 2, the center-to-center spacing between adjacent phosphor areas or dots 33 and 34 on planar screen 28 is designated P. The projection of length P toward one of the color centers (projected toward 29 in the drawing) defines a length W at the flat mask 27. It is evident that if the maximum of the screen surface is to be utilized as a mosaic covered by tangent phosphor dots or areas in a planar color tube, the diameter of each dot must equal the spacing P. In such a tube, the phosphor dot is regular in shape, uniform in size, and the dots are tangent to one another, over the entire screen area.

Figure 3 depicts the relationship of the color centers 29–31, whether achieved by mounting separate electron guns or by switching and deflecting a single electron beam in such manner that the beams seem to originate at the color centers. The distance between color centers is A, and the distance from any color center to the center of the triangle formed by the color centers is S. Thus, if a "color-center" circle is constructed about O as a center, and passing through the color-centers 29–31, the diameter of such a circle is 2S.

Figure 4:
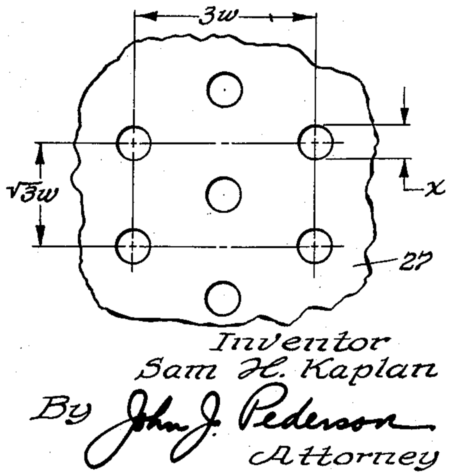
Figures 3 and 4 are partial illustrations useful in understanding the operation of the structure illustrated in Figures 1 and 2.

Figure 4 indicates the relative spacing and dimensions of the apertures in a conventional parallax mask 27, based upon the length W. Along the horizontal (scanning) axis, the apertures are spaced by a center-to-center distance of 3W, while the vertical spacing between apertures is $\sqrt{3}W$. Each of the apertures is regular in shape; in a dot-type mask, such as mask 27, each aperture is a perfect circle.

Although the color centers are shown in triangular form (Figure 3) and the uncorrected dot-type mask is illustrated as having circular apertures therein (Fig. 4), the principles of the invention are also applicable to color tubes utilizing collinear guns and/or slit-type masks having rectangular apertures therein. In fact, as will become evident from the subsequent explanation, the invention is applicable to all color-reproducing cathode-ray tubes having a mask and a screen, and in which either the mask or the screen is not planar.

Figure 5:
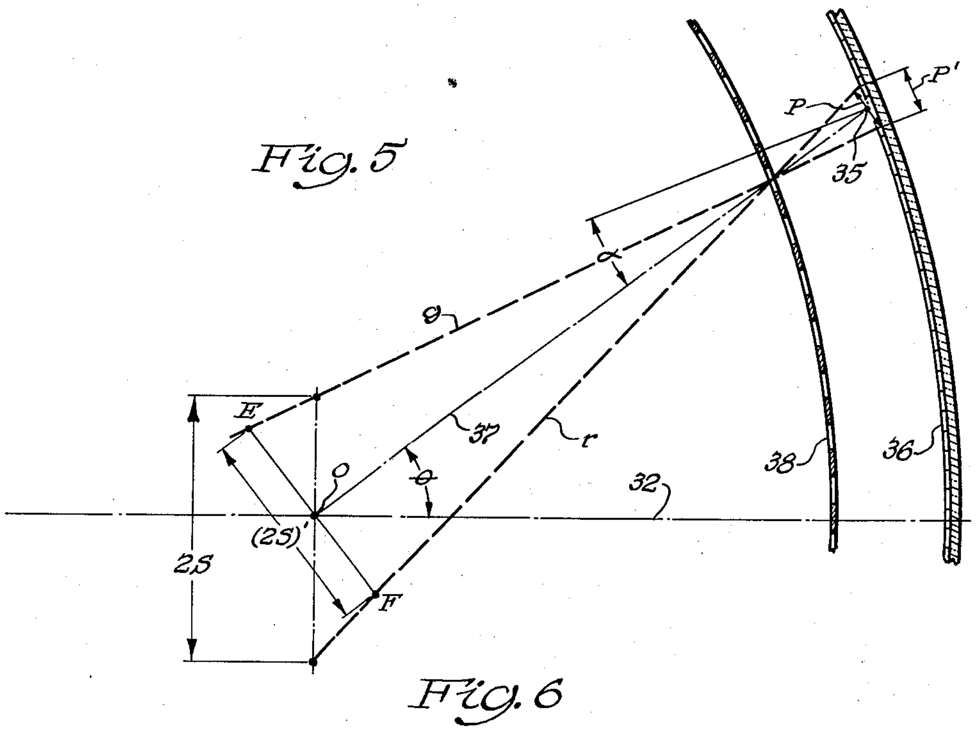
Figure 5 is a top view illustrating the geometry of the triad shape error in a spherical color cathode-ray tube.

To obtain maximum utilization of the screen area in a spherical tube, that is, a tube having a screen or mask shaped to generally resemble a segment of a sphere, due consideration must be given to conditions other than those controlling in the planar case. Figure 5 shows generally the geometry for a spherical tube, and particularly illustrates the foreshortening in the radial direction which occurs in the spherical system. From point 35 on curved screen 36, the actual diameter 2S of the color-center circle appears as (2S)′; that is, the distance 2S appears to be compressed by a factor equal to $\cos\theta$, where $\theta$ is the angle of beam deflection. It is evident that the lengths EO and OF must be separately calculated and then added to give the true length of (2S)′, but the value of $2S\cos\theta$ so closely approximates the exact value of (2S)′, that no significant error is introduced by equating (2S)′ to $2S\cos\theta$. However, the distance P′ (the length along screen 36 between the points where electron beams $g$ and $r$ are incident upon the screen) at screen 36 is larger than dimension P (where P is measured perpendicular to the line of sight 37) by the factor $$\frac{1}{\cos \alpha}$$

where $\alpha$ is the angle of incidence of line 37 with screen 36 (again, as with $\cos \theta$, $$\frac{1}{\cos \alpha}$$

is an approximation having negligible error). Accordingly, $S_r$, the apparent radius of the color-center circle, in the radial direction (equal to S′ in Figure 5), is determined by:

$$S_r = S\frac{\cos \theta}{\cos \alpha} \qquad (1)$$

The radius S in the tangential direction, $S_t$ (measured in a plane perpendicular to the plane of Figure 5), remains equal to S, while $S_r$ varies in accordance with Equation 1. It is evident that Equation 1 gives the measure of the triad shape error described generally hereinbefore. Because the values of $\cos \theta$ and $\cos \alpha$ are fixed for a given point on the screen, another expression for the magnitude of the radial foreshortening or compression is that such foreshortening is a function of the shortest distance from a given point on the screen to the tube axis.

Figure 6:
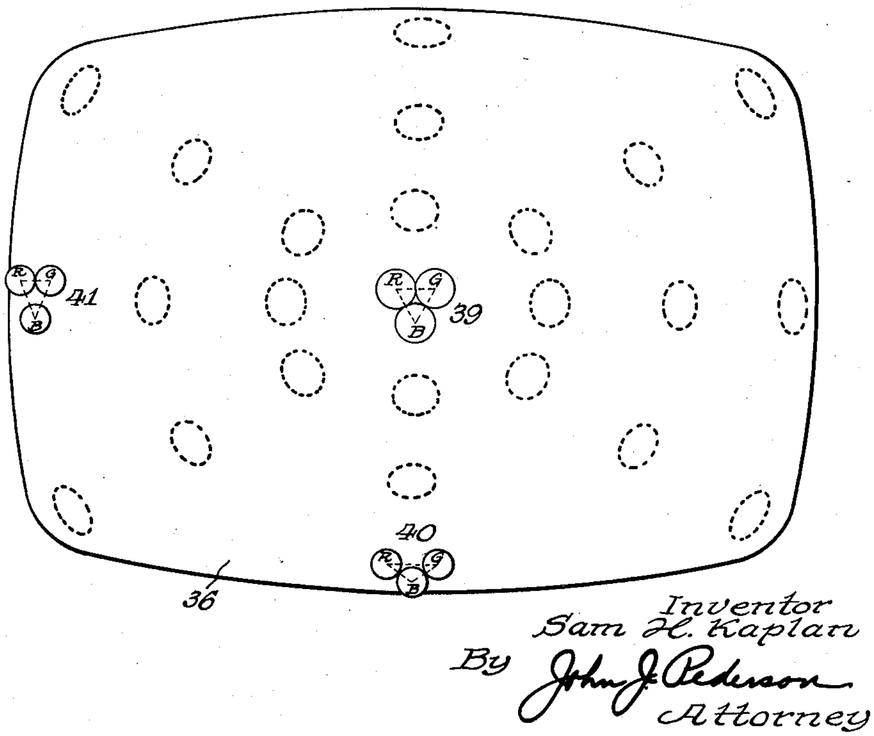
Figure 6 is a view from the scanning side of a fluorescent screen for a spherical color cathode-ray tube illustrating the effect of the radial compression, or triad shape, error.

The effect of the triad shape error is portrayed in Figure 6, which illustrates three phosphor dot triads disposed on different areas of the luminescent screen 36. These phosphor dots are placed on the screen by well known exposure techniques, in which a photo-resist material is disposed upon the vacant screen, and then illuminated from a source placed beyond the mask at the position of one of the color centers. Three such exposure steps (one from each color center), when the beam is each time directed through a central aperture of the mask, cause the positioning of a regular triad 39 at the center of screen 36. It is noted that each of the phosphor dots of triad 39 is tangent to the other two dots and a circle (not shown) can be constructed having the same center as triad 39, with the circumference of the circle passing through the center of each phosphor dot in triad 39.

Because of the radial compression or foreshortening, triad 40 comprises phosphor dots disposed as shown at the lower portion of screen 36. The compression is in the radial direction, toward the center of the screen. A regualr curve passing through the center of each of the phosphor dots in triad 40 forms an ellipse (not shown). The triad 41 is also distorted in the radial direction, and likewise a regular curve connecting the points coincident with the centers of each of the phosphor dots in triad 41 forms an ellipse (not shown). This compression or foreshortening is illustrated generally over the remainder of screen 36, by showing the ellipses which would be formed by connecting the phosphor dot centers of triads spaced away from the center of the screen. The ellipse in each case is the image of the foreshortened color center circle.

Figure 7:
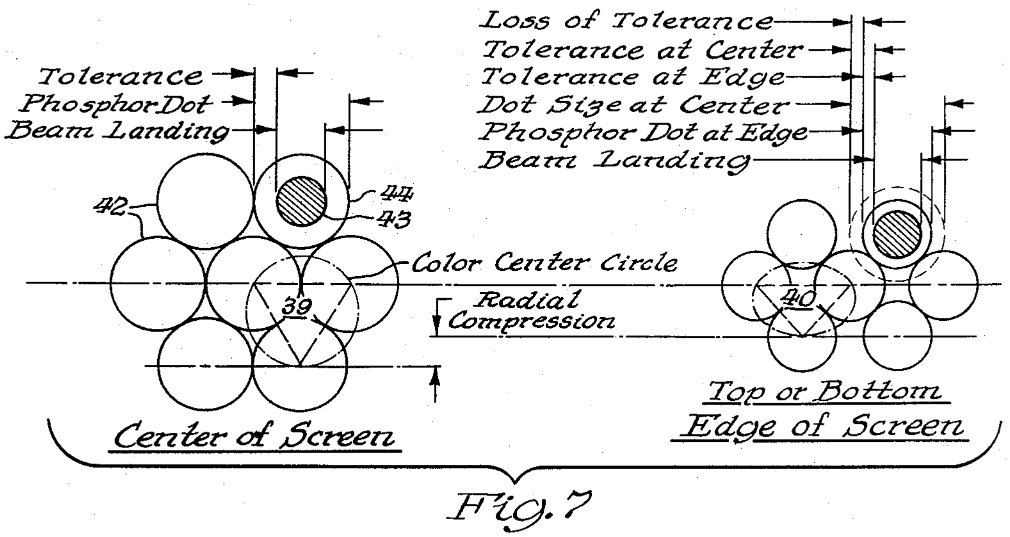
Figure 7 is a more detailed showing of portions of Figure 6.

Figure 7 includes more detailed showings of triads 39 and 40. The left hand portion of Figure 7 illustrates a polarity of phosphor dots 42 such as are formed in the central portion of screen 36. The electron beam landing area 43 is also shown; the space between beam landing area 43 and the circumference of the phosphor dot 44 is the guard ring, or tolerance area.

The right hand portion of Figure 7 illustrates the triad 40 at the lower edge of the fluorescent screen, showing the wasted screen space caused by the radial compression which increases toward the edge of the fluorescent screen. Because the electron beam landing area is substantially uniform over the surface of the fluorescent screen, the tolerance area or guard ring at the edge of screen 31 is substantially less than that at the central portion, as indicated by the legends on the drawing. It is apparent that, because of the reduced tolerance area at the periphery of the fluorescent screen, a small manufacturing, assembly or operation variation error causes the electron beams to impinge at least partially on the wrong phosphor dot, causing color impurity. To increase the tolerance area at the edge of the screen it is necessary to diminish the electron beam landing area, which reduces the brightness of the screen area.

Figure 8:
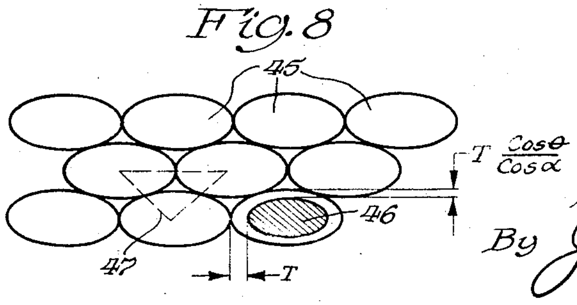

In accordance with the inventive teaching, the tolerance area or the brightness produced at the edge of the luminescent screen can be increased by deliberately introducing a radial compression into the pattern of the aperture mask, in turn producing an effective "stretching" of the phosphor dot pattern illustrated in the right hand portion of Figure 7 in the tangential direction as the distance from the tube axis increases, as illustrated by the corrected pattern of the phosphor dots 45 in Figure 8. Such correction or deliberate distortion of the dot pattern, when accompanied by the provision of a similarly corrected electron beam landing area 46, can be utilized to produce either increased brightness or an increase in the guard ring or tolerance area. Because of radial compression, the thickness of the guard ring, which is constant and equal to T in the tangential direction, varies as $$\frac{\cos \theta}{\cos \alpha}$$

in the radial direction. It is noted that the shape of triangle 47, connecting the centers of three adjacent phosphor areas 45, is substantially identical to the shape of the triad 40.

Figure 9:
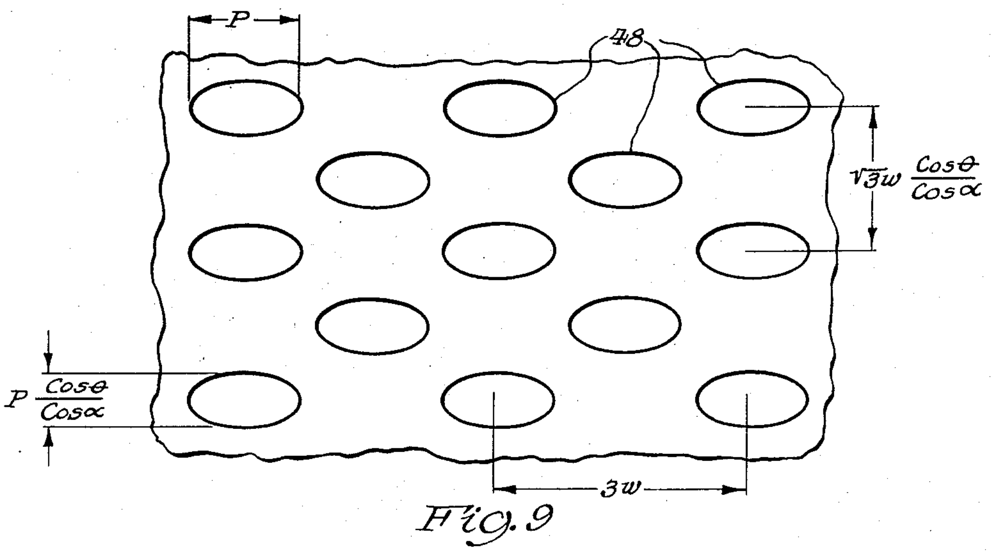
Figures 8 and 9 are partial showings, from the viewing side, of a phosphor dot arrangement and a mask aperture arrangement, respectively, constructed in accordance with the inventive teaching.

The corrected, or elliptically distorted, phosphor dot pattern of Figure 8 can be provided by conventional exposure techniques from a compensated or corrected aperture mask, such as that shown partially in Figure 9. The compensated mask aperature pattern may comprise a plurality of elliptical apertures 48, which apertures are substantially circular in the center (not shown) of the mask and become more elliptical (the minor axis being in the radial direction) toward the edge of the mask, as illustrated generally by the elliptical pattern of Figure 6. It is noted that the radial spacing of the apertures (Figure 9) varies according to the same ratio which governs the increasing ellipticity of the apertures. The production of such a modified, or compensated, aperture mask will now be described.

Figure 10:
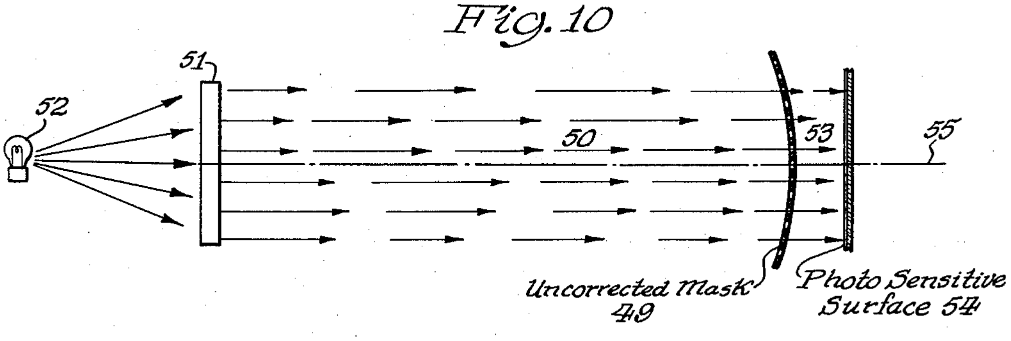
Figures 10–13 are illustrative showings of various methods for carrying out the teachings of the invention.

As illustrated in Figure 10, an uncorrected mask 49 having a regular pattern of apertures is positioned so that light rays 50 illuminate one of its surfaces. The light 50 is comprised of collimated light rays formed by lens arrangement 51, beyond which light source 52 is located. Alternatively, light from a point source (not shown) placed at a substantial distance from mask 49 can be utilized. The light beams 53 which pass through the apertures of uncorrected mask 49 establish a projected image of mask 49 upon the photo-sensitive surface 54, which is positioned in a substantially flat plane and thus is non-uniformly spaced from the mask 49. The term "non-uniformly spaced" describes the disposition of mask 49 in a plane not parallel to the plane of photo-sensitive surface 54; obviously a relative curvature or non-uniformity of spacing is also obtained if mask 49 is flat and surface 54 is not flat. As used herein, "non-uniformly spaced" is also descriptive of an exposure system in which the mask and screen are actually positioned in parallel planes, but an effective or apparent non-uniformity of spacing is accomplished by a lens or lens system interposed between these planes. Because the light rays 50 are substantially parallel and mask 49 is effectively non-uniformly spaced from the plane of photo-sensitive surface 54, it is evident that a modified aperture pattern image is produced on the photo-sensitive surface 54, which modified image is compressed in the radial direction. The modified aperture pattern image established on surface 54 is photographically reproduced and utilized by methods well known in the art to produce in a mask blank a modified or compensated aperture mask pattern corresponding to the photographic reproduction of the modified aperture pattern image. The mask blank is a thin, flat piece of sheet metal which is etched or otherwise provided with the aperture pattern prior to being stamped or otherwise formed into a predetermined shape. The photographic reproduction may be accomplished directly by coating the mask blank with a photo-resist prior to illumination through uncorrected mask 49, and then etching the exposed blank to produce therein the compensated or corrected aperture pattern. Alternatively, the photographic reproduction can be effected on a photographic plate, and the corrected aperture pattern image projected onto the mask blank. These production methods, and the substances used therein, are well known and understood in the art. The compensated mask, a peripheral segment of which is illustrated in Figure 9, is used to produce, also by methods well known and understood in the art, a corrected phosphor dot pattern on the screen in which the dots utilize the maximum available screen area, and thus provide a picture of increased brightness and/or permit increased manufacturing tolerances, or a greater beam deflection angle.

Figure 11:
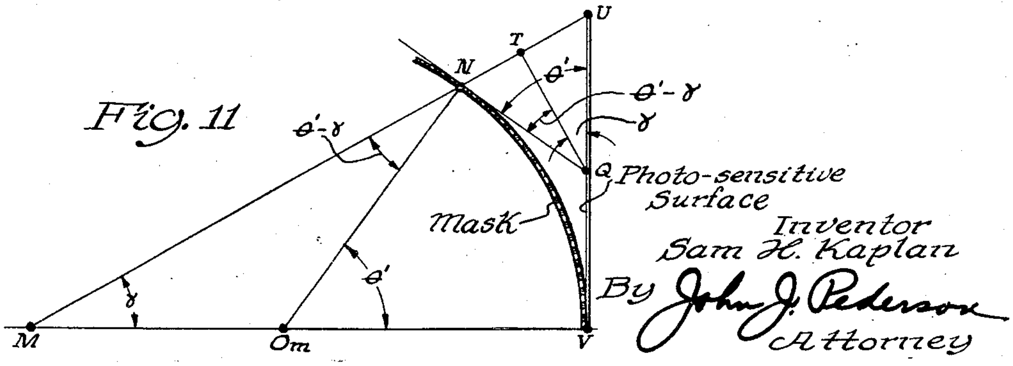

Considering practical manufacturing limitations, it is difficult and expensive to produce a beam of collimated light for the exposure technique illustrated and described in connection with Figure 10. Figure 11 illustrates another method of producing the modified aperture pattern image, in which the exposure point M is positioned relatively close to the plane UV of the photo-sensitive surface. Considering the general principles of projection, it is evident that the distance MV must be greater than twice the distance O*m*V, the radius of the uncorrected mask, to obtain compression of the peripheral aperture pattern. To illustrate the compression of the aperture images at the perimeter of the mask, it is considered that a ray of light originates at the point source M, and passes through a mask aperture at N to impinge on the photo-sensitive surface at point U. The line NQ is constructed tangent to the mask at point N, and TQ is constructed perpendicular to MU. Thus the angle $\theta'$, equal to the deflection angle $\theta$ minus the angle of incidence $\alpha$ (Figure 5), is equal to the angle NQU, and the projection angle $\gamma$ is equal to TQU.

It is evident that the aperture at point N is compressed in the ratio of $$\frac{TQ}{NQ}$$

or as the value of $\cos(\theta'-\gamma)$. From TQ to UQ, however, the aperture image is elongated in the ratio of $$\frac{UQ}{TQ}$$

or in the ratio of $$\frac{1}{\cos\gamma}$$

Accordingly, the compression ratio of the apertures in the radial direction, utilizing the projection system illustrated in Figure 11, is equal to $$\frac{\cos(\theta'-\gamma)}{\cos\gamma} \tag{2}$$

From this relationship, after determining the value of $\theta'$ from the deflection angle $\theta$ and the angle of incidence $\alpha$, it is possible to determine the projection angle $\gamma$, and thus the distance MV can be determined.

The deflection angle $\theta$ and the angle of incidence $\alpha$ are determined by the physicial construction of the color tube. Fore example, in a 74 degree tube, $\theta$ is 37 degrees, and $\alpha$ is approximately 14 degrees. The calculation of Equation 1 for these values gives a radial compression of approximately 0.823 at the edge of the screen. The actual compression at the edge of the mask will be somewhat smaller than 0.823 because of the stamping operation to produce the spherically or otherwise curved mask from the flat mask structure, in which the perimeter of the mask is fixedly positioned and a die member displaced to produce the desired shape in the final mask structure. This operation causes a radial elongation of the apertures, in the amount of approximately 3% of the aperture size. By dividing the original compression factor, 0.823, by stamping stretch factor 1.03, a value of approximately 0.799 is determined for the radial compression factor at the edge of the mask.

The compression factor of 0.799 is equated to the actual compression effected in the projection system of Figure 11, that is, to the value of Equation 2. The value of $\theta'$ is known, being the difference of $\theta$ and $\alpha$, or 23 degrees. Accordingly, the only unknown in Equation 2 is $\gamma$. Thus this relationship is solved for the value of $\gamma$, from which the projection distance MV is determined. By utilizing the projection system of Figure 11 the desired radial compression can be produced in the modified aperture pattern image which is formed on the photo-sensitive surface.

Figure 12:
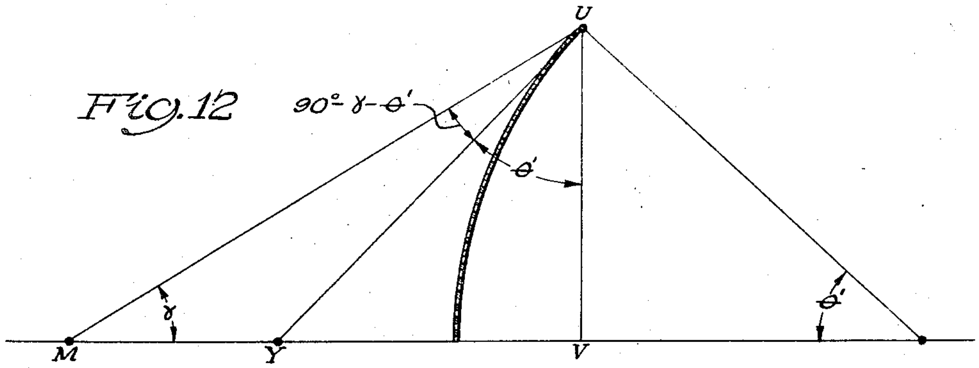

When the actual values for the deflection angle $\theta$ and angle of incidence $\alpha$ are substituted to determine the compression factor, it has been found difficult to obtain the required compression with the method illustrated generally in Figure 11. The radial compression is more readily attained by projecting according to the system illustrated in Figure 12, the projection being from a point on the convex side of the mask, that is, the side opposite the side on which its center of curvature is located. It is apparent that Equation 2 is not the correct criterion to determine the compression in Figure 12. The correct relationship to determine radial compression in Figure 12 is $$\frac{\cos(\theta'+\gamma)}{\cos\gamma} \tag{3}$$

as is evident by comparing the geometry of Figure 12 with that of Figure 11.

In Figure 12, UY is a line constructed tangent the mask at point U. It is apparent that the angle MUY is equal to $(90°-\gamma-\theta')$. Accordingly, when the sum of $\theta'$ and $\gamma$ equals 90 degrees, the projected light is tangent to the surface of the mask and no projection through the mask is possible. It is clear that, by projecting from the convex side of the mask as shown in Figure 12, a substantial radial compression can be effected.

In the method illustrated in Figure 12 the pattern of the apertures which lie closest to the axis MV is somewhat spread apart as the edge apertures are compressed as described hereinbefore. This stretching of the central apertures has been found to be of the order of 8%, and is not objectionable when the edge of the array is corrected to compensate for the radial compression. However, if desired, the center of the array can be restored by a simple photographic reduction step, or by a subsequent projection where the projection point M is on the same side of the mask as is the center of the radius of curvature, and is spaced from the mask by a distance equal to twice the mask radius. In such a stereographic projection the edge array can be maintained at the same compression factor introduced by the first exposure, while compensation for the greater portion of the central aperture spreading introduced by the first projection is effected in the second exposure, by enlarging the spacing of the edge array. The resultant modified aperture pattern image can then be reduced in size by techniques well known and understood by those skilled in the optical arts, so that the size of the mask aperture area is restored to that before the second projection.

Figure 13:
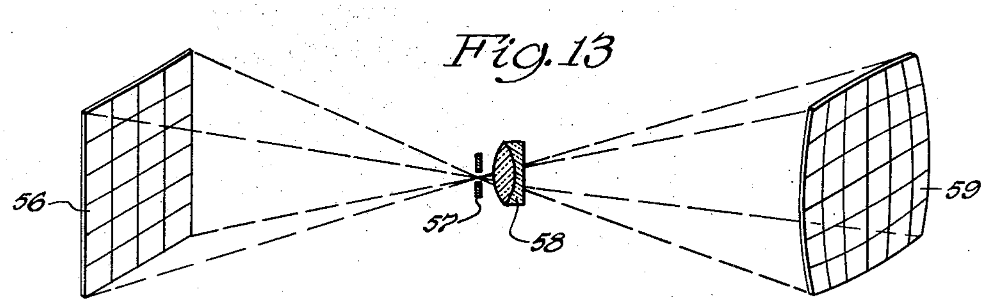

It will also be apparent to those skilled in the optical arts that certain lenses or lens arrangements, for example, of the type used to produce the well-known "barrel" distortion, can be utilized in the production of a compensated or modified aperture pattern in accordance with the inventive teaching. Figure 13 illustrates generally the manner in which a regular grid pattern 56 is projected through a lens stop 57 and lens arrangement 58 to form a distorted pattern 59 in another plane. The modified pattern 59 illustrates the barrel type distortion referred to above. It is evident that each of the points (except the center) of the pattern 59 is compressed radially toward the center of the pattern, similar to the radial compression effect in the spherical tubes described hereinbefore. Accordingly, a mask structure having a regular aperture pattern therein can be substituted for the grid pattern 56 and illuminated from the rear to provide a series of light beams passing through stop 57 and lens arrangement 58 to impinge on a photo-sensitive surface in a radially compressed pattern, related to the distortion illustrated by the barrel shaped pattern 59.

Other lens arrangements and illumination techniques can be utilized to produce a compensated aperture mask. For example, a lens having the requisite spherical aberration can be disposed between a point source of light and a flat uncorrected aperture mask, so that the light from the source is distorted by passage through the lens prior to passing through the apertures in the uncorrected mask. In a manner similar to the method described above, the beams passing through the apertures of the uncorrected mask then form a modified aperture pattern image in a plane which is effectively non-uniformly spaced from the plane of the uncorrected mask. Those skilled in the art will doubtless recognize and devise different methods for introducing an effective non-uniformity of spacing between the plane of the uncorrected aperture mask and the plane in which the modified aperture pattern image is reproduced.

The invention has been described and illustrated in connection with spherical mask and screen arrangements in which the mask is of the dot type and the phosphor dots are laid on the screen in a triangular pattern. It is noted that the principles described above are equally applicable to other configurations of the screen, and of the mask, as well as to the configuration of the electron beams at the plane-of-deflection. For example, the screen and mask may be cylindrical in form, or these elements may be surfaces of revolution which are not perfect spheres. The mask may be of the slit type, and thus the screen may utilize a line configuration of phosphorescent material, or other configurations such as elongated ellipses. The electron beams may be disposed in a line, as they are when collinear guns are used in the tube assembly; a collinear gun assembly can be used when either the dot type or the slit type mask is utilized. Irrespective of the particular configurations of mask, screen, and electron beams, the inventive teaching can be utilized to eliminate the undesirable effects of the radial compression error described hereinabove. Such an objectionable foreshortening is present in any color reproducing cathode-ray tube in which either the mask or the screen, or both, are not planar in form.

The mask radius and screen-mask spacing have been, at best, only compromises between conflicting requirements. The compromises effected in prior art devices have produced the objectionable waste of screen area and loss of tolerance at the edge of the screen. The inventive teaching makes possible, when utilized in conjunction with the teaching of applicant's above-identified copending application, the elimination of the effects of each of the triad size, shape and location errors. To eliminate the effects of all three of these errors, the compensated mask is produced in accordance with the inventive teaching, and the tilted lens arrangement described in applicant's copending application is then used in fabrication of the screen to eliminate effects of the triad size and location errors.

While a particular embodiment of the invention, and various methods for producing such embodiment, have been shown and described, it will be obvious to those skilled in the art that changes and modifications may be made therein without departing from the invention in its broader aspects, and therefore, the aim in the appended claims is to cover all such changes and modifications as fall within the true spirit and scope of the invention.

I claim:

1. For a color-reproducing cathode-ray tube, a compensated aperture mask structure having a plurality of apertures of predetermined shape at the axial aperture and distorted into an elliptical configuration by radial foreshortening as a function of the distance of the apertures from said axial aperture.

2. For a color-reproducing cathode-ray tube, a compensated aperture mask structure having a plurality of apertures of predetermined shape at the center of said mask and distorted by radial foreshortening as a function of the distance of the apertures from said center, the center-to-center spacing of said apertures in the radial direction simultaneously varying as a function of said distance.

3. In a color-reproducing cathode-ray tube for selectively directing an electron beam onto a preassigned portion of a fluorescent screen, a compensated mask structure having a plurality of apertures circular in shape at the center of said mask and elliptically distorted as a function of the distance of the apertures from said center, the minor axes of the elliptical apertures being related to the major axes thereof substantially in the ratio of $$\frac{\cos \theta}{\cos \alpha}$$

where $\theta$ is the deflection angle of said electron beam with respect to the tube axis and $\alpha$ is the angle of incidence of said electron beam on said screen.

4. A color-reproducing cathode-ray tube for selectively directing an electron beam onto a preassigned portion of a fluorescent screen, said screen comprising a plurality of phosphor areas regular in shape at the axial beam landing area and distorted into an elliptical configuration by radial foreshortening as a function of the distance of said phosphor areas from said axial beam landing area.

5. A color-reproducing cathode-ray tube for selectively directing an electron beam onto a preassigned portion of a fluorescent screen, said screen comprising a plurality of phosphor areas regular in shape at the center of said screen and distorted by radial foreshortening as a function of the distance of said areas from said center, the center-to-center spacing of said phosphor areas in the radial direction simultaneously varying as a function of said distance.

6. A color-reproducing cathode-ray tube for selectively directing an electron beam onto a preassigned portion of a fluorescent screen, said screen comprising a plurality of phosphor dots circular in shape at the center of said screen and elliptically distorted as a function of the distance of the dots from said center, the minor axes of the elliptical dots being related to the major axes thereof substantially in the ratio of $$\frac{\cos \theta}{\cos \alpha}$$

where $\theta$ is the deflection angle of said electron beam with respect to the tube axis and $\alpha$ is the angle of incidence of said electron beam on said screen.

References Cited in the file of this patent

UNITED STATES PATENTS

| | | |
|---|---|---|
| 2,728,008 | Burnside | Dec. 20, 1955 |
| 2,755,402 | Morrell | July 17, 1956 |
| 2,795,719 | Morrell | June 11, 1957 |
| 2,837,429 | Whiting | June 3, 1958 |
| 2,840,470 | Levine | June 24, 1958 |

OTHER REFERENCES

Epstein et al. article, "Improvements in Color Kinescopes Through Optical Analogy," R.C.A. Review, vol. XVI, pages 491 to 497, December 1955.